April 2, 1968

A. BROTHMAN ET AL 3,376,567

PORTABLE METER-READING DEVICE

Filed June 24, 1965

INVENTORS
ABRAHAM BROTHMAN
STEPHEN J. HALPERN
ALAN J. BRUCKNER

OSTROLENK, FABER, GERB & SOFFEN
ATTORNEYS

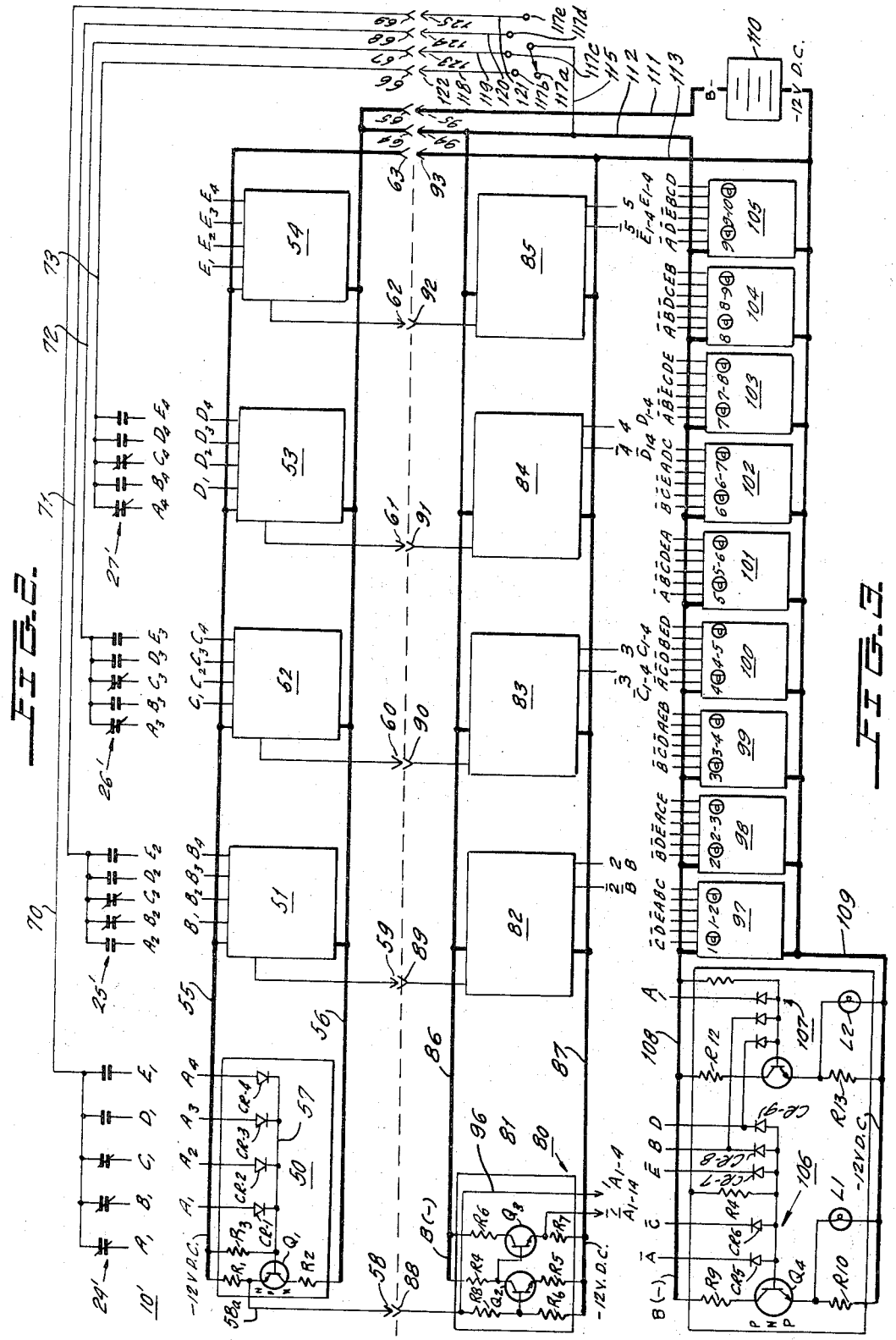

FIG.4.

|   | 1 | 2 | 3 | 4 | 5 |
|---|---|---|---|---|---|
| 0 | 0 | 1 | 0 | 1 | 0 |
| 1 | 1 | 1 | 0 | 0 | 0 |
| 2 | 1 | 0 | 1 | 0 | 0 |
| 3 | 1 | 0 | 0 | 0 | 1 |
| 4 | 0 | 1 | 0 | 0 | 1 |
| 5 | 0 | 0 | 0 | 1 | 1 |
| 6 | 1 | 0 | 0 | 1 | 0 |
| 7 | 0 | 0 | 1 | 1 | 0 |
| 8 | 0 | 0 | 1 | 0 | 1 |
| 9 | 0 | 1 | 1 | 0 | 0 |

| 1 | 2 | 3 | 4 | 5 |      |
|---|---|---|---|---|------|
| 0 | 1 | 1 | 1 | 0 | 9-0  |
| 1 | 1 | 0 | 1 | 0 | 0-1  |
| 1 | 1 | 1 | 0 | 0 | 1-2  |
| 1 | 0 | 1 | 0 | 1 | 2-3  |
| 1 | 1 | 0 | 0 | 1 | 3-4  |
| 0 | 1 | 0 | 1 | 1 | 4-5  |
| 1 | 0 | 0 | 1 | 1 | 5-6  |
| 1 | 0 | 1 | 1 | 0 | 6-7  |
| 0 | 0 | 1 | 1 | 1 | 7-8  |
| 0 | 1 | 1 | 0 | 1 | 8-9  |

INVENTORS
ABRAHAM BROTHMAN
STEPHEN J. HALPERN
ALAN J. BRUCKNER

OSTROLENK, FABER, GERB & SOFFEN
ATTORNEYS

United States Patent Office 3,376,567
Patented Apr. 2, 1968

3,376,567
PORTABLE METER-READING DEVICE
Abraham Brothman, Dumont, N.J., Stephen J. Halpern, New York, N.Y., and Alan J. Bruckner, Bloomfield, N.J., assignors, by mesne assignments, to Sangamo Electric Company, Springfield, Ill., a corporation of Delaware
Filed June 24, 1965, Ser. No. 466,780
10 Claims. (Cl. 340—188)

The instant invention relates to reading devices and more particularly to a portable device for reading meters, preferably of the utility type which, due to their installation are inaccessible for providing a normal reading.

Many quantities typically being supplied throughout the world are measured by the means of meters. For example, with respect to the supplying of electrical power, water, gas, oil and other quantities, it is typical to provide a meter for the purpose of measuring the total amount of power or liquid supplied to the subscriber up to the present date. For example, in power distribution systems it is typical to find meters such as, for example, watt-hour meters which are installed in homes, buildings, factories and the like, for providing a visually observable reading of the total number of kilowatt hours supplied to the subscriber up to the present date. Meters of this sort are typically read by an individual who upon observance of the dials on the meter-reading face, either manually writes down the meter reading, or prepares a punch card or other document representative of the meter which he is reading. In many instances it becomes physically impossible for the party wishing to take the meter reading to observe the meter as it may be installed in a very inaccessible place.

It is an object of the instant invention to provide a novel electrical circuit within the utility meter housing which is coupled through suitable conductor means to a location which is accessible to the party wishing to take the meter reading. A portable meter-reading unit supplied with a suitable plug-in device may then be plugged in to the conductors at an accessible location in order to take the meter reading in a very simple manner.

The utility meter is provided with suitable shaft angle encoder means coupled to the utility meter cyclometer, or register means, for developing a binary code representative of the dial face reading. In the case where the meter reading is comprised of four decimal digits, four such shaft angle encoders are provided to generate a five-bit binary code where each of the four decimal digits comprises the total for reading.

The shaft angle encoders are, in turn, coupled through a solid-state logic circuit, the output terminals of which are coupled through suitable conductor means to provide an input plug which may be located at a point accessible to a party wishing to take the meter reading.

The meter-reading device is comprised of a solid-state logic circuit having a plurality of lamps representing each decimal digit. The input to the portable meter-reading device is a suitable plug means which is coupled into the plug means leading out from the meter. The portable meter-reading device is provided with a suitable power supply and switch means designed to power only one of the shaft angle encoders at any given instant. As each shaft angle encoder is provided with power, the binary coded reading of the shaft angle encoder is coupled into the portable meter-reading device solid-state logic circuit in order to selectively energize one of the ten lamps identifying the decimal numbers 0–9. The operator, upon observing the lamps will note that only one of the group of lamps will be lit indicating what the decimal digit state of the shaft angle encoder being read is at that given instant of time. The manual switch means may then be stepped to remove power from the first shaft angle encoder and apply power to the next shaft angle encoders to determine the decimal character which this shaft angle encoder represents. The decimal character state of the remaining shaft angle encoders may be determined in a like manner.

A unique coding arrangement is employed in order to provide a more accurate determination of the state of the utility meter at the time it is read. In addition to the lamps representing decimal numbers 0–9, a second group of lamps are provided, one of which, when energized, indicates the fact that the dial reading of the utility meter is close to a transitional position between two decimal digits. This fact may be used to advantage when the next most significant decimal digit position is observed in order to confirm the first reading obtained. For example, consider the reading 1922. The portable meter-reading device is set up in such a manner that the thousands decimal digit position will be the first one read. It can be seen that since the next number is decimal 9, the pointer for the thousands decimal digit dial face will be very close to the graduation on the dial face, separating the decimal digit one region from the decimal digit two region. This will cause a lamp identified as the one-two lamp to be energized. In reading the next decimal digit, i.e., the hundreds decimal digit, it will be seen that this decimal digit is 9, which indicates that the pointer for the thousands decimal digit position will have moved approximately nine-tenths of the distance between the decimal one gradation and the decimal two gradation. Thus, the indication given by the 1–2 lamp conditions the observer to the fact that the next decimal digit to be read should be a number 7, 8, 9 or 0. Any other decimal number would provide an indication that faulty operation is being obtained.

The portable meter-reading device is an all-solid state arrangement with the exception of the manually operable switch means making it extremely light weight and easy to carry and use, modifying existing utility meters which may be located in inacessible areas through the use of the shaft angle encoders and solid-state diode logic. The reading may be very readily obtained by providing a plug means located at an accessible point which is coupled to the output terminals of the solid-state logic circuit within the meter by suitable substantially flexible conductor means.

The instant invention thus provides an extremely light weight portable meter-reading device which greatly facilitates the reading of meters located in inaccessible areas, thereby greatly simplifying the duties of an individual reading of such meters.

It is therefore one object of the instant invention to provide a novel portable meter-reading device. Another object of the instant invention is to provide a novel portable meter-reading device for reading meters which may be located in substantially inaccessible areas.

Another object of the instant invention is to provide a novel solid-state portable meter-reading device cooperating with a solid-state diode logic circuit and encoder means within the meter to be read for the purpose of providing an accurate indication of the meter reading.

Still another object of the instant invention is to provide a novel solid-state portable meter-reading device for use in reading meters which may be located in inaccessible areas, having a novel diode logic circuit employing a code format designed to provide readings of great accuracy.

These and other objects of the instant invention will become apparent when reading the accompanying description and drawings in which:

FIGURE 1 shows a utility meter of the type which may be employed in the instant invention in schematic fashion.

FIGURE 2 is a schematic diagram showing the manner in which the meter of FIGURE 1 is modified by solid-state diode logic.

FIGURE 3 is a schematic diagram showing the portable meter-reading device of the instant invention.

FIGURE 4 is a chart showing the binary code employed in the instant invention for the purpose of explaining the operation of the portable meter-reading device.

Referring now to the drawings, FIGURE 1 shows a utility meter 10 which, in the figure, is represented merely by a front face plate 11 provided with four dials 12–15, respectively, each having cooperating pointers 16–19, respectively, for providing a visually observable reading of the meter. It should be understood that the entire meter structure has been omitted for purposes of clarity and it is sufficient to understand that such a meter, for example, a watt-hour meter employed by utility companies, is capable of measuring watt hours and is mechanically coupled to a cyclometer arrangement which has an appropriate gear train for the purposes of establishing a 10:1 rotational relationship between adjacent shafts 20–23, respectively which in turn drive the pointers 16–19, respectively, in order to develop a visually observable reading of the total number of watt hours consumed by the subscriber location at which the watt-hour meter is placed. While a watt hour meter has been given as one example, it should be understood that other meters of various types, such as, for example, water meters, gas meters and the like, typically employ a dial face arrangement of the type shown in FIGURE 1 which is either electrically or mechanically coupled to the quantity measured, depending only upon the properties of the quantity, i.e., as to whether it is electrical energy, a fluid material, a gas, et cetera. The structure of a typical meter and the manner in which it is mechanically coupled to a register dial face arrangement is shown in detail in copending applications Serial No. 241,730, entitled Meter Encoder Transmitter, filed December 3, 1962, by A. Brothman et al. and Serial No. 466,779, entitled Solid-State Transmitter Means, filed June 26, 1965, by A. Brothman et al., both of which applications are assigned to the assignee of the instant invention.

The gear train (not shown) provided within the meter register or cyclometer are so arranged as to provide a 10:1 ratio between adjacent shafts 20–23 of the register. For example, shaft 23 will complete ten full revolutions for every one revolution completed by shaft 22; shaft 22 will complete ten full revolutions for each revolution completed by shaft 21; and so forth.

The dial face arrangement 10, shown in FIGURE 1, is assumed to have been operated in such a manner as to provide the decimal reading 1922, due to the relationships between the decimal gradations of each dial face 12–15 and the position of pointers 16–19, respectively, which have been rotated by the shafts 20–23, respectively, to which these pointers are coupled. In order to provide the desired reading for use of the portable meter-reading device of the instant invention, the shafts 20–23 are each arranged to be mechanically coupled with a shaft angle encoder 24–27, respectively. The mechanical coupling is represented by the dashed lines 24a–27a, respectively. Each shaft angle encoder 24–27 operates in such a manner as to provide a binary coded decimal reading at its output terminals, dependent upon the angle which its associated shaft 20–23, respectively, assumes at any given instant. Each shaft angle encoder is thereby provided with output terminals $A_1-E_1$ through $A_4-E_4$, respectively. The shaft angle encoders employed herein may be either of the drum or disc type, as described in copending applications Serial No. 125,247, entitled Code Stack Assembly, filed July 19, 1961, by A. Brothman et al. and Serial No. 353,362, filed March 20, 1964, by A. Brothman et al., entitled Meter Register Gear Encoder, both of which applications are assigned to the assignee of the instant invention.

FIGURE 4 shows the binary codes generated by any one of the shaft angle encoders 24–27 and FIGURE 5 shows a top view of a disc encoder which may be employed in the instant invention.

Considering the chart of FIGURE 4 in cooperation with FIGURE 1, it can be seen that the binary coded decimal representation for the decimal number 2 is 10100. Considering dial face 15, it can be seen that the pointer 19 lies clearly between the gradations for the decimal number 2 and the decimal number 3 so that it can be clearly and unequivocally defined as a decimal number 2 representation. Since the pointer 19 lies approximately half-way between the decimal 2 and decimal 3 gradations, it can be fairly assumed that the units dial face (if there were such a dial face provided) would provide a reading of decimal 5.

Considering the ideal face 12 representing the ten thousands decimal digit, it can be seen that the pointer 16 is in very close proximity to the decimal Two gradation and is, in fact, so close to the gradation as to possibly be interpreted as a decimal Two reading if care is not given to the reading of dial face 12. The code format of the instant invention takes such a reading into account by providing a "three-out-of-five" code format in the transitional region between two decimal digits. A two-out-of-five code format is provided in the region where a decimal reading is clear and unequivocal.

As one example, the binary code for decimal Two is 10100 and the binary code for decimal Three is 10001. A modulo Two addition of these two binary codes provides the code 10101, which is identified as a Two-Three code, as shown by the chart in FIGURE 4. The two-three code is generated by a shaft angle encoder when the pointer associated with that shaft angle encoder is in the immediate region of one of the decimal gradations of the dial face. Such a reading immediately indicates to an observer that the next decimal number occupying that next most significant decimal digit position should be either decimal 7, decimal 8, decimal 9 or decimal 0. This acts as an additional check on the accuracy of the reading. For example, the code generated by the shaft angle encoder 24 to represent the position of pointer 16 for dial face 12 would be the 1–2 code which is 11100. This immediately provides an indication that the decimal digit occupying the next most significant decimal digit position should lie within the range from decimal 7 through decimal 9. It can be seen that the transition from the binary code to decimal one to the binary code for decimal one-two is changed in only one binary digit position. Likewise, in moving from the code for decimal one-two to the code for decimal two, only a single binary digit position is changed. This unique arrangement assures that any errors in the operation of the shaft angle encoder are substantially minimized.

FIGURE 5 shows a disc encoder designed to generate the two-out-of-five and three-out-of-five codes shown in the chart of FIGURE 4. The disc structure 150 is a printed circuit configuration which is provided on an insulated substrate 51 in any well known manner with the encoder disc having six annular rings 152–157, respectively, each of said rings having a plurality of arcuate conductive segments. For example, the annular ring 152 is provided with two conductive segments 152a and 152b; annular ring 153 is provided with arcuate conductive segments 153a and 153b; and so forth with the remaining annular rings so as to produce a unique code having a bit length of six binary bits. The code is so arranged that, in order to identify clearly a single number, the binary code is a two-out-of-five self-checking type code. That is, out of five possible binary bits, only two of these bits are in the binary one condition for any given code combination. The transition between two decimal numbers, however, from the visually observable viewpoint, it is normally difficult to distinguish which side of the transition point the pointer 19 of FIGURE 1, for example, is located. For example, considering FIGURE 5, the region between the dashed lines 158 and 159 represents the decimal number 0. However, to the immediate left of line 158 lies the region for decimal number 9 and a pointer lying in the immediate region of the line 158 may, from the visually observable viewpoint, appear to lie on either side of the line 158. The code on code disc 150 takes this into consideration by adding to the five bit code an ambiguity bit to identify the fact that the decimal reading for that code disc lies in the transitional regions between two number such as, for example, the region of lines 158 between the decimal numbers 9 and 0. In addition to the "tagging on" of an ambiguity bit to the two-out-of-five code, the region in which the ambiguity bit is in the binary one state also indicates the fact that a transition to a three-out-of-five code will take place. For example, let it be assumed that the dial pointer 19 for one of the shafts lies to the left of line 158 and well away from the ambiguity region. This means that the code disc 150 will generate the code for the decimal number 9, which binary code is 010100. At this time the sensing fingers 180 represented by the solid colored dots shown in FIGURE 5 make electrical contact with segments 153a and 155′ and engage the insulating substrate 151 in all other positions.

As the pointer 19 moves in close proximity and near coincidence with the line 158, the ambiguity bit which is in the annular ring 157, is picked up by the ambiguity sensing finger so as to generate a two-out-of-five code plus an ambiguity bit which occurs when the sensing fingers lie on dashed line 160. In this position the binary code now becomes 010101 thus making a transition from a two-out-of-five code to a two-out-of-five plus ambiguity bit code. As the pointer 19 moves to the right of dashed line 160, the code picks up an additional binary bit to become a three-out-of-five plus ambiguity bit code. Thus when the sensing fingers lie slightly to the right of dashed line 160, they engage the conductive segments to form the code 011101. As the pointer 19 moves well to the right of line 161, the ambiguity bit is dropped and the bit of annular ring 153a is likewise dropped in order to generate a clear decimal zero representation of code 001100. Thus it can be seen that the pie-shaped region defined by the two radial lines 158 and 161 which contain the line 160, identify the fact that the transitional region between the decimal reading 9 and the decimal reading 0 occurs in this pie-shaped area. This entire transitional region is identified by the ambiguity bit such as, for example, the ambiguity bit arcuate segment 157′ in the angular ring 157. It is also this region wherein the binary one state in annular ring 153 is dropped and the binary one state in the annular ring 154 is picked up. Each remaining transitional line between decimal numbers has a like ambiguity bit or ambiguity conductive segment which identifies a pie-shaped transitional region in which the code change takes place. As to other novel features of the code disc 150 shown in FIGURE 5 such features are set forth in detail in copending application Ser. No. 353,362 which application is incorporated herein by reference thereto.

A further consideration of the code disc 150 of FIGURE 5 shows that the central portion of the disc is provided with a circular conductive segment 163 having a narrow shape projection or pointer portion 163a for use in alignment purposes. The disc is further provided with an annular conductive ring 164 surrounding its periphery and which is provided with a narrow shape projection 164a which points in the direction of projection of 163a. These two projections may be joined by the imaginery line 160 and are employed for the purpose of aligning the sensing fingers along a radius of the code disc 150. Code disc 150 is provided with still one more annular conductive ring 165. This annular ring cooperates with one sensing finger 180′ which supplies a D.C. voltage level to the closed continuous ring 165. This D.C. level is electrically connected to the remaining segments of annular rings 152–157 by means of radially aligned conductive segments. For example, each ambiguity segment in the annular ring 157 is connected through the continuous annular ring by the segments 166. The segments of annular ring 156 are connected to annular ring 165 by means of the radially aligned segments 167; the arcuate segments of annular ring 157 and by the radial segments 167. This can similarly be found to be true for all other remaining arcuate segments provided on the code disc 150. As a further example, consider the outermost arcuate segment 152b in the anular ring 152. A continuous conductive path can be traced in this segment through radial segment 171, arcuate segment 153b, radial segment 170, arcuate segment 154b, radial segment 169, arcuate segment 155b, radial segment 168, arcuate segment 156b, radial segment 167, arcuate segment 157′ and finally, radial segment 166 to the continuous conductive ring 165. Thus from the code arrangement provided therein it can be seen that each annular ring is provided with the sensing finger making sliding engagement with the segments of its associated annular ring, with the segments conveying a voltage level or signal to a sensing finger upon wiping contact therebetween and with no voltage level or signal being imparted to a sensing finger when it fails to make contact (i.e. as positioned upon the insulating substrate of the annular ring and not upon the conductive segment). While one specific disc encoder arrangement has been described herein it should be understood that the instant invention may be employed with disc or drum encoder means of various types and the type of encoder means employed lends no novelty to the instant invention.

It should be understood that in the embodiment of the instant invention at least four such encoder means of the type shown in FIGURE 5 are employed in cooperation with the cyclometer register means 10 shown in FIGURE 1. It is quite typical to ignore the reading of the units position, i.e., of the reading of the right-hand-most dial face shown in FIGURE 1 since the reading of this units position dial is usually quite insignificant. Thus the dials representing the tens, hundreds, thousands, and ten thousands decimal digit positions are each provided with a shaft angle (disc) encoder of the type shown in FIGURE 5.

FIGURE 2 shows a schematic representation of the meter designated 10′ with the shaft angle encoders designated 24′–27′ being schematically represented by a group of contact pairs. In the case where a binary one bit is present for any of the binary digit positions $a$–$e$, this condition is represented by a closed contact pair and in the case where a binary zero digit position is to be represented, this is indicated by an open contact pair. Considering the demical reading of FIGURE 1, the shaft angle encoder 24′ will have its contact pairs 30, 31 and 32 in the closed position and will have its contact pairs 33 and 34 in the open position to represent the One-Two code which is 11100. In a like manner, the contacts 35–39, 40–44 and 45–49 of shaft angle encoders 25′–27′, respectively, have their contact pairs in the position shown in FIGURE 2 for the purpose of representing the codes for decimal 9 (01100); decimal 2 (10100); and decimal 2 (10100), respectively. Thus, a binary coded representation appears at the output terminals $a1$–$e1$ through $a4$–$e4$ of the shaft angle encoders 24′–27′, respectively, to represent the reading 1922 of the meter face 10′.

The meter 10′ is further provided with a solid-state circuit which couples the outputs of the shaft angle encoders 24′–27′ to the portable meter reading device of FIGURE 3. The logic circuit is comprised of a plurality of OR gates 50–54, respectively; since all of these OR gates are substantially identical to one another only the OR gate 50 has been shown in detailed schematic form for purposes of clarity.

The OR gate 50 is comprised of a transistor Q1, having its emitter connected to the −12 volt D.C. bus 55 through resistor R1. The collector of transistor Q1 is coupled to the B— bus 56 through resistor R2. The base electrode of transistor Q1 is coupled to the −12 volt D.C. bus 55 through resistor R3, establishing a voltage level at the base electrode of the transistor for maintaining transistor Q1 in cut-off condition.

A plurality of semi-conductors CR1–CR4 have their cathode terminals coupled to the base electrode of transistor Q1 through conductor 57. The anode terminals of semi-conductors CR1–CR4 are electrically connected to the binary bit positions $A_1$–$A_4$, respectively of the shaft angle encoders 24′–27′. By powering the shaft angle encoders on a one-at-a-time basis, only one of the digit positions $A_1$–$A_4$ will be coupled to the base electrode of transistor Q1.

Transistor Q1, being connected in emitter follower fashion, has its output taken from the emitter electrode with the output level appearing at the terminal 58, by means of the conductor 58a. The −12 volt D.C. bus 55 has an input terminal 63 for connection with the portable meter reading device in a manner to be more fully described. In a like manner, the B— bus 56 is provided with first and second output terminals 64 and 65, respectively, for coupling with the portable meter reading device.

As was previously described, each shaft angle encoder 24′–27′ is powered with a D.C. level with the coupling to the individual annular arrays of segments, represented by the contact symbols 30–49, respectively, is derived by means of the conductors 70–73, respectively, the opposite ends of which are provided with input terminals 66–69, respectively, for connection to the portable meter reading device.

The source of power which is provided in the portable meter reading device is sequentially coupled to the shaft angle encoders 24′–27′ on a one-at-a-time basis, causing the outputs of the shaft angle encoder so powered to determine the binary state of the outputs appearing at terminals 58–62 of the OR gates 50–54, respectively.

Turning now to consideration of the portable meter reading device, 80, of FIGURE 3, it can be seen that the meter reading device is comprised of a plurality of circuits 81–85 for generating complementary binary outputs for each binary input signal which it accepts. All of the circuits 81–85 are substantially identical so that only one circuit (81) has been shown in schematic detail. The circuit 81 is comprised of transistors Q2 and Q3. Transistor Q2 has its collector electrode coupled to B— bus 86 through resistor R4. The emitter electrode of transistor Q2 is coupled to the −12 volt bus 87 through resistor R5. The base electrode is coupled to the −12 volt D.C. bus 87 through resistor R6 for the purpose of maintaining transistor Q2 normally in the cut-off state. The collector electrode of transistor Q2 is coupled to the base electrode of transistor Q3 which is connected in emitter follower fashion. The complementary output of circuit 81 is taken from the emitter electrode of transistor Q3 and appears at the $\overline{A}_1$-4 output terminal. The $A_1$-4 output terminal is coupled through conductor 95 to the input terminal 87 of circuit 81.

If a binary zero level is impressed upon the input terminal 87 of circuit 81, this level is insufficient to drive transistor Q2 into conduction so that its collector electrode remains at the B—, or binary one level. Thus, an inversion of the input level occurs through transistor Q2. The binary one level appearing at the output of transistor Q2 is coupled to the base of transistor Q3. Since this is an emitter follower circuit the output terminal $\overline{A}_1$-4 generates a binary one condition which is the inverted state of the binary zero input signal. The symbology employed herein is such that whatever the binary state of $A_1$-4 may be, symbol $\overline{A}_1$-4 is in the complementary binary state. Thus, for example, if a binary one level appears at the input terminal 88 of circuit 81, the $A_1$-4 terminal will be at binary one and the $\overline{A}_1$-4 terminal will be at binary zero. In the other case, where a binary zero is presented to the input of circuit 81, the $A_1$-4 terminal will be binary zero and the $\overline{A}_1$-4 terminal will be binary one, respectively.

Each remaining circuit 82–85, likewise provides the output of the binary bit with which it is associated, together with the complementary output of the same bit.

These outputs and their complements are employed in the circuits 96–105, respectively, each of which circuits are substantially identical to one another so that only one circuit 96 has been shown in schematic detail. The logic circuit 96 is comprised of two logical AND gates 106 and 107 for use in controlling the conductive states of transistors Q4 and Q5, respectively. The transistor Q4 is connected in emitter follower fashion with its collector electrode coupled to the B— bus 108 through resistor R9. The emitter electrode is coupled to the −12 volt D.C. bus 109 through resistor R10. Connected in parallel with resistor R10 is a normally deenergized lamp L1, which when lit represents the presence of a decimal zero. The base electrode of transistor Q4 is coupled through resistor R11 to the B— bus 108. Also connected to the base electrode are a plurality of semi-conductors CR5–CR9 which their anode electrodes coupled to the base of transistor Q4. The cathode electrodes of diodes CR5–CR9 are coupled to the A-NOT, C-NOT, E-NOT and B and D output terminals of the circuits 81–85, respectively.

The manner in which the lamp L1 is lit is as follows:

Let it be assumed that one of the shaft angle encoders of the group 24′–27′ is being read and that this particular shaft angle encoder is presently generating the binary code for the decimal zero. From the chart of FIGURE 4 it can be seen that the decimal zero is represented in binary by 01010. These binary levels are impressed upon the input terminals 88–92 of circuits 81–85, respectively. This means that the $\overline{A}$ output terminal of circuit 81 will be binary one; the B terminal of circuit 82 will be binary one; the $\overline{C}$ terminal of circuit 83 will be binary one; the B terminal of circuit 84 will be binary one; and the $\overline{E}$ terminal of circuit 85 will be binary one. Since the binary one level is represented by a B— voltage level, this means that B— appears simultaneously at the cathode input terminals of diodes CR5–CR9, respectively. This causes transistor Q4 to be driven into conduction, developing a voltage across emitter resistor R10. The voltage developed across emitter resistor R10 is sufficient to energize lamp L1 to indicate the presence of a decimal zero for the shaft angle encoder being read at that given instant.

Considering the AND gate 107, this circuit is comprised of semi-conductors CR10–CR12, respectively, which have their anode terminals connected to the base electrode of transistor Q5. The emitter electrode of transistor Q5 is coupled to the −12 volt D.C. bus 109 through resistor R13. Lamp L2 is connected in parallel across resistor R13. The collector electrode of transistor Q5 is coupled to the B— bus 108 and the base electrode of transistor Q5 is coupled to the B— bus 108 through resistor R14.

The operation of the AND gate 107 is as follows:

Let it be assumed that the shaft angle encoder being read generates the 01 code which, from FIGURE 4 can be seen to be 11010. In this case, binary one voltage levels will appear at the input terminals 88, 89 and 91 of circuits 81, 82 and 84, respectively, while binary zero levels will be impressed upon the inputs 90 and 92 of circuits 83 and 85, respectively. This will cause binary one voltage levels to appear at the output terminal A of circuit 81, the output terminal B of circuit 82 and the output terminal D of circuit 84, respectively. These binary one, or B— voltage level states will be simultaneously impressed upon the cathode terminals of semi-conductors CR10 through CR12, respectively, placing the base electrode of transistor Q5 at the B— level. This drives transistor Q5 into conduction, developing a voltage drop across resistor R13 which is sufficient to energize lamp L2.

The remaining logic circuits 97–105 are substantially identical in function and configuration to circuit 96 with the exception that their input terminals are selectively coupled to the output terminals of circuits 81–85 in such a manner that only one of the group of ten lamp pairs will be energized at any given instant.

The —12 volt D.C. bus 109 is coupled to the negative terminal of a 12-volt battery 110. The positive or B— terminal of battery 110 is coupled through a conductor 111 to an output terminal 95 which is electrically connected to input terminal 65 of meter 10′ when the meter is being read. The positive, or B— bus 108 is coupled through conductor 112 to output terminal 94 which is electrically connected to input terminal 64 of meter 10′. The —12 volt D.C. terminal of battery 110 is coupled through a conductor 113 to the —12 volt bus 87 powering circuits 81–85, as well as being connected to output terminal 93, which electrically engages input terminal 63 of meter 10′. Conductor 112 is coupled through a conductor 115 to the movable arm 116 of switch means 114. The movable and manually operable arm 116 is designed to be selectably connected with a plurality of contacts 117a–117e. Contact 117a is an off position contact, while contacts 117b–117e are electrically coupled through conductors 118–121, respectively, to the output terminals 122–125. These output terminals electrically mate with the input terminals 66–69 of meter 10′.

The portable meter-reading unit 80 is preferably mounted within a suitable housing which is provided with a knob (not shown) for manipulating the rotatable arm 16. It should be understood that suitable indicating numbers in alignment with a pointer on the knob would be provided so as to readily determine which position the switch occupies at any given instant of time. With the exception of the manually operable knob, the switch means 114 and circuits 81–85 and 96–105, as well as 12-volt battery 110, would be mounted within the portable device housing.

The operation of the portable meter-reading device 80 is as follows:

Let it be assumed that the meter being read presently presents the reading 1922. The meter 10′ shown by a black box in FIGURE 6 and which may be mounted in some inaccessible position, has its output terminals 58–69 arranged within a suitable socket means 132 and coupled to the outputs of circuits 50–54, respectively, and conductors 70–73, respectively, by a multi-conductor cable 133. The socket 132 may be positioned in any suitable location which is accessible to the party desiring to read the meter.

The portable meter reading device 80 is provided with a plug 130 having a plurality of pins 131 representing the output terminals 88–95 and 122–125 and which is designed to mate with the socket 132 in one unique position by suitable keying means (not shown) which is provided to assure proper mating between socket 132 and plug 130. The output terminals 88–95 and 122–125 are coupled through a flexible cable to the proper circuits and buses within the portable meter reading device. The housing 134 for the portable meter reading device 80 is provided with a manually operable knob 135 which may be selectively moved between the OFF and Four positions. After proper insertion of plug 130 into socket 132, the manually operable control knob 135 is moved from the "OFF" position to the "ONE" position, thus placing the rotary arm 116 in electrical engagement with contact 117b. This establishes a conductive path from the positive terminal of battery 110 through conductor 111, terminal 95, meter terminal 65, meter terminal 64, portable meter reading device terminal 94, conductor 112 and conductor 115 to rotary arm 116, contact 117b, conductor 118, meter reading device terminal 112, meter terminal 66 and conductor 73, so as to power shaft angle encoder 27′. It will be noted that none of the other shaft angle encoders are powered at this given time.

The insertion of plug 130 into socket 132 also provides power for circuits 50–54 of meter 10′, as well as circuits 81–85 and 96–105 of the portable meter reading device 80. Since the shaft angle encoder 27′ should be reading the tens decimal digit position, a binary coded reading for the decimal 2 should be generated. This code is 10100, as can be seen from the chart of FIGURE 4. These binary conditions appear at the output terminals $A_4$–$E_4$ of the shaft angle encoder to be suitably impressed upon the associated input terminals $A_4$–$E_4$ of the OR gate circuits 50–54, respectively. The state of each of these binary outputs is passed through the emitter follower circuits and appear at the output terminals 58–62 of circuits 50–54, respectively. These output terminals electrically mate with the input terminals 88–92 of circuits 81–85 in the meter reading device 80 in order to generate all five binary bits and their complements.

Since a binary code representing the decimal 2 is being transmitted the output terminals which will be binary one level at this given instant will be the A, B-NOT, C, D-NOT and E-NOT output terminals of circuits 81–85, respectively. These conditions are impressed upon the five left-handmost input terminals of circuit 98 causing the decimal 2 lamp to become lit, indicating the presence of a decimal 2 reading for shaft angle encoder 27′.

After this reading is observed and written down, the operator may then move the manually operable control knob 135 of FIGURE 6 into the next position to power the next shaft angle encoder. This sequence will continue until all shaft angle encoders are powered.

When reading the shaft angle encoder 24′, which will generate a 1–2 code of 11100, this will cause the 1–2 lamp of circuit 97 to become energized, apprising the operator of the fact that the next most significant digit, if it be decimal 7, decimal 8 or decimal 9, indicates that the lighting of the 1–2 lamp should be interpreted as being a decimal one. If the next most significant decimal digit is found to be a decimal zero, the interpretation of the 1–2 lamp of circuit 97 is that it is a decimal 2. If the interpretation of the next most significant decimal digit lies in the range from approximately two through approximately seven, this immediately provides an indication that something within the circuit is an error, thereby apprising the examiner that maintenance and/or repair work may be required for that particular meter.

It can be seen from the foregoing that the instant invention provides a novel portable meter reading device which being substantially all solid-state can be extremely compact, lightweight and very simple to use. Such an arrangement greatly expedites the reading of meters which may be normally inaccessible for any reason and provides an arrangement in which the encoder and logic circuit provided within the meter requires no local power source as it is easily and readily powered by the power supply within the portable meter reading device. The accuracy of readings taken are enhanced by the provision of ten lamp pairs visible from the exterior of the portable meter reading device housing so that decimal readings which are extremely close to a decimal gradation on the typical utility meter reading dial face may be easily and readily interpreted.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A portable device for reading meters having a register; a plurality of shaft angle encoders for converting the decimal reading of the register into binary coded data and diode logic means for coupling the encoder to an output receptacle; said portable device being comprised of first means for electrically coupling the portable device to the meter receptacle; a power source; manually operable switch means for applying power to each encoder in a sequential manner; second means coupled to said first means for receiving the data bits representing an encoder reading and forming the first and second outputs representing state of each bit and its complement, respectively; a first plurality of gates having their inputs selectively coupled to said second means for generating an output at only one gate at any given instant; a first plurality of lamp means each being coupled to an associated gate output and being energizable to indicate the decimal state of the shaft angle encoder being examined.

2. The portable device of claim 1 further comprising a second plurality of gates selectively coupled to said second means for generating an output at only one gate at any given instant; a second plurality of lamp means each being coupled to an associated gate of said second plurality and being energizable to indicate that the decimal state of the encoder being examined is in close proximity to the transition point between two adjacent decimal numbers.

3. The device of claim 2 wherein said first plurality of gates is comprised of AND gates each having a predetermined number N of inputs selectively coupled to outputs of said second means; N–A inputs of each AND gate receiving complementary outputs.

4. The device of claim 2 wherein said first plurality of gates is comprised of ten AND gates each having a predetermined number N of inputs selectively coupled to outputs of said second means; N–A inputs of each AND gate receiving complementary outputs.

5. The device of claim 3 wherein said second plurality of gates is comprised of AND gates each having N–B inputs coupled to selected data outputs only, of said second means.

6. The device of claim 3 wherein said second plurality of gates is comprised of ten AND gates each having N–B inputs coupled to selected data outputs only, of said second means.

7. Means comprising a meter having a register for providing a visually observable reading coupled to said register, a plurality of shaft angle encoders for converting an associated decimal digit of the decimal reading of the register into binary coded representation; a receptacle; diode logic means coupled to said encoders; multiconductor cable means coupling said diode logic means to an output receptacle; a portable device for reading said meter being comprised of first means for removably electrically coupling the portable device to the meter receptacle; a power source; manually operable switch means coupled to said first means for applying power to each encoder in a sequential manner; second means coupled to said first means for receiving the data bits representing an encoder reading and forming the first and second outputs representing state of each bit and its complement, respectively, a first plurality of gates having their inputs selectively coupled to said second means for generating an output at only one gate at any given instant, a first plurality of lamp means each being coupled to an associated gate output and being energizable to indicate the decimal state of the shaft angle encoder being examined.

8. The means of claim 7 wherein said diode logic means comprising M OR gates each having a plurality of inputs equal in number to the number of shaft angle encoders; the inputs of each OR gate being coupled to one output of each shaft angle encoder; each of said shaft angle encoders including rotatable means for generating a first binary code for representing each decimal digit and for generating a second binary code representing a meter reading of a decimal which is in close proximity to transition between two adjacent decimal digits.

9. The means of claim 7 wherein said diode logic means comprising M OR gates each having a plurality of inputs equal in number to the number of shaft angle encoders; the inputs of each OR gate being coupled to one output of each shaft angle encoder; each of said shaft angle encoders including rotatable means for generating a first binary code for representing each decimal digit and for generating a second binary code representing a meter reading of a decimal which is in close proximity to transition between two adjacent decimal digits; said first binary code being a 2-out-of-5 binary code format.

10. The means of claim 7 wherein said diode logic means comprising M OR gates each having a plurality of inputs equal in number to the number of shaft angle encoders; the inputs of each OR gate being coupled to one output of each shaft angle encoder; each of said shaft angle encoders including rotatable means for generating a first binary code for representing each decimal digit and for generating a second binary code representing a meter reading of a decimal which is in close proximity to transition between two adjacent decimal digits; said first binary code being a 2-out-of-5 binary code format; said second code being a 3-out-of-5 binary code format.

No references cited.

THOMAS B. HABECKER, *Primary Examiner.*